(12) United States Patent
Kim et al.

(10) Patent No.: US 9,743,091 B2
(45) Date of Patent: Aug. 22, 2017

(54) METHOD FOR ENCODING/DECODING IMAGE, AND DEVICE USING SAME

(71) Applicant: LG ELECTRONICS INC., Seoul (KR)

(72) Inventors: Jungsun Kim, Seoul (KR); Joonyoung Park, Seoul (KR); Chulkeun Kim, Seoul (KR); Hendry Hendry, Seoul (KR); Byeongmoon Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 20 days.

(21) Appl. No.: 14/652,655

(22) PCT Filed: Dec. 12, 2013

(86) PCT No.: PCT/KR2013/011755
§ 371 (c)(1),
(2) Date: Jun. 16, 2015

(87) PCT Pub. No.: WO2014/098456
PCT Pub. Date: Jun. 26, 2014

(65) Prior Publication Data
US 2015/0373332 A1 Dec. 24, 2015

Related U.S. Application Data

(60) Provisional application No. 61/737,828, filed on Dec. 17, 2012, provisional application No. 61/752,977, filed on Jan. 16, 2013.

(51) Int. Cl.
*H04N 19/16* (2014.01)
*H04N 19/136* (2014.01)
(Continued)

(52) U.S. Cl.
CPC ......... *H04N 19/136* (2014.11); *H04N 19/119* (2014.11); *H04N 19/122* (2014.11);
(Continued)

(58) Field of Classification Search
CPC .. H04N 19/119; H04N 19/122; H04N 19/124; H04N 19/136; H04N 19/159;
(Continued)

(56) References Cited

U.S. PATENT DOCUMENTS 6,748,020 B1 * 6/2004 Eifrig ..................... H04N 19/40
348/423.1
6,865,225 B2 * 3/2005 Kitamura ............. H04N 19/176
375/240

(Continued)

FOREIGN PATENT DOCUMENTS

JP 2006-290262 A 10/1994
JP 2000-023190 A 1/2000
(Continued)

OTHER PUBLICATIONS

Zhang et al, Chroma Intra Prediction Based on Inter-Channel Correlation for HEVE, Jan. 2014.*
(Continued)

*Primary Examiner* — Shan Elahi
(74) *Attorney, Agent, or Firm* — Dentons US LLP

(57) ABSTRACT

A method for decoding an image, and a device using the same are disclosed. The method for decoding an image comprises the steps of: inducing a chroma component block corresponding to a luma component block on the basis of chroma format information indicating chroma component sampling corresponding to luma component sampling; dividing the chroma component block into transformation blocks of a chroma component for transformation on the basis of division information indicating whether a first block
(Continued)

has been divided into second blocks for transformation; and acquiring residual information on the transformation blocks of the chroma component by performing at least one of inverse transformation and inverse quantization on the basis of the transformation blocks of the chroma component.

7 Claims, 16 Drawing Sheets

(51) Int. Cl.
| | |
|---|---|
| H04N 19/176 | (2014.01) |
| H04N 19/119 | (2014.01) |
| H04N 19/122 | (2014.01) |
| H04N 19/186 | (2014.01) |
| H04N 19/61 | (2014.01) |
| H04N 19/124 | (2014.01) |
| H04N 19/159 | (2014.01) |
| H04N 19/60 | (2014.01) |
| H04N 19/70 | (2014.01) |
| H04N 19/91 | (2014.01) |

(52) U.S. Cl.
CPC ......... *H04N 19/124* (2014.11); *H04N 19/159* (2014.11); *H04N 19/176* (2014.11); *H04N 19/186* (2014.11); *H04N 19/60* (2014.11); *H04N 19/61* (2014.11); *H04N 19/70* (2014.11); *H04N 19/91* (2014.11)

(58) Field of Classification Search
CPC .... H04N 19/176; H04N 19/186; H04N 19/60; H04N 19/61; H04N 19/70; H04N 19/91
USPC ............. 375/240.03, 240.01, 240.02, 240.04
See application file for complete search history.

(56) References Cited

U.S. PATENT DOCUMENTS

| | | | | |
|---|---|---|---|---|
| 6,950,468 | B2* | 9/2005 | Satoh | H04N 19/197 375/240 |
| 2001/0055477 | A1* | 12/2001 | Hoshi | H04N 19/61 386/306 |
| 2003/0138160 | A1* | 7/2003 | Ishikawa | H04N 19/86 382/260 |
| 2007/0065005 | A1* | 3/2007 | Cha | H04N 19/34 382/166 |
| 2007/0154087 | A1 | 7/2007 | Cho et al. | |
| 2007/0297511 | A1* | 12/2007 | Chiu | H04N 19/51 375/240.16 |
| 2010/0309286 | A1* | 12/2010 | Chen | H04N 13/0059 348/43 |
| 2011/0206125 | A1* | 8/2011 | Chien | H04N 19/52 375/240.16 |
| 2012/0003861 | A1* | 1/2012 | Kwasny | B60L 11/1818 439/474 |
| 2012/0195378 | A1* | 8/2012 | Zheng | H04N 19/105 375/240.12 |
| 2013/0003824 | A1* | 1/2013 | Guo | H04N 19/176 375/240.03 |
| 2013/0022125 | A1* | 1/2013 | Sato | H04N 19/52 375/240.16 |
| 2013/0083850 | A1* | 4/2013 | Alshina | H04N 19/13 375/240.12 |
| 2013/0101018 | A1* | 4/2013 | Chong | H04N 19/196 375/240.02 |
| 2013/0107970 | A1* | 5/2013 | Wang | H04N 19/176 375/240.18 |
| 2015/0063457 | A1 | 3/2015 | Gamei et al. | |

FOREIGN PATENT DOCUMENTS

| | | |
|---|---|---|
| JP | 2000-023193 A | 1/2000 |
| JP | 3850015 B2 | 9/2006 |
| JP | 2006-290262 A | 10/2006 |
| JP | 2010-004472 A | 1/2010 |
| JP | 2011-077761 A | 4/2011 |
| JP | 2014-535221 A | 12/2014 |
| JP | 2015-518341 A | 6/2015 |
| KR | 10-2011-0127456 A | 11/2011 |
| KR | 10-2012-0035843 A | 4/2012 |
| WO | 2013/067174 A1 | 5/2013 |
| WO | 2013/160694 A | 10/2013 |
| WO | 2014/055344 A1 | 4/2014 |

OTHER PUBLICATIONS

Schwarz et al, Extension of High Efficiency Video Coding (HEVC) for Multiview Video and Depth Data, 2012.*
Zhang et al, Chroma Intra Prediction Based on Inter-Channel Correlation for HEVC, Jan. 2014.*
Lee et al, Low Complexity Video Enhancement of Video Phone Calls with a Limited Mobile Terminal's Capability, 2009.*
Jianqiu et al, A wavelet based intra-frame coding algorithm focosing on face region, 2003.*
Bross, et al.: "High efficiency video coding (HEVC) text specification draft 8", JCTVC-J1003_d0, XP030112947, JCT-VC of ITU-T SG-16 WP3 and ISO/IEC JTC1/SC29/WG11, 10th Meeting, Stockholm, SE, Jul. 11-20, 2012.
Rosewarne, et al.: "AHG7: Transforms for extended chroma formats", JCTVC-K0171, XP030113053, JCT-VC of ITU-T SG-16 WP3 and ISO/IEC JTC1/SC29/WG11, 11th Meeting, Shanghai, CN, Oct. 10-19, 2012.
Lim, et al.: "Description of video coding technology proposal by SK telecom, Sejong Univ. and Sungkyunkwan Univ.", JCTVC-A113, XP030007551, JCT-VC of ITU-T SG-16 WP3 and ISO/IEC JTC1/SC29/WG11, 1st Meeting, Dresden, DE, Apr. 15-23, 2010.
Cohen: "AHG7: Cross-verification of JCTVC-K0171, Transforms for extended chroma formats", JCTVC-K0338, JCT-VC of ITU-T SG-16 WP3 and ISO/IEC JTC1/SC29/WG11, 11th Meeting, Shanghai, CN, Oct. 10-19, 2012.

* cited by examiner

X = Positions of luma samples
O = Positions of chroma samples

X = Positions of luma samples
O = Positions of chroma samples

X = Positions of luma samples
O = Positions of chroma samples

FIG. 10
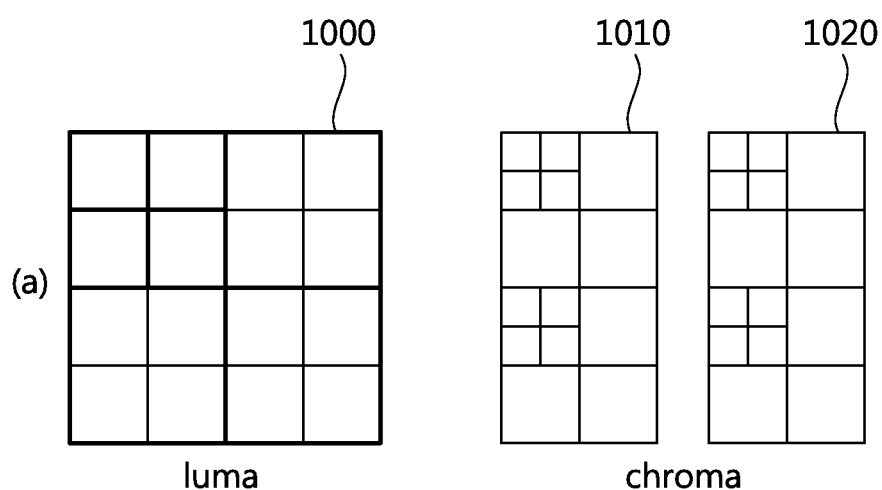
(a) luma / chroma
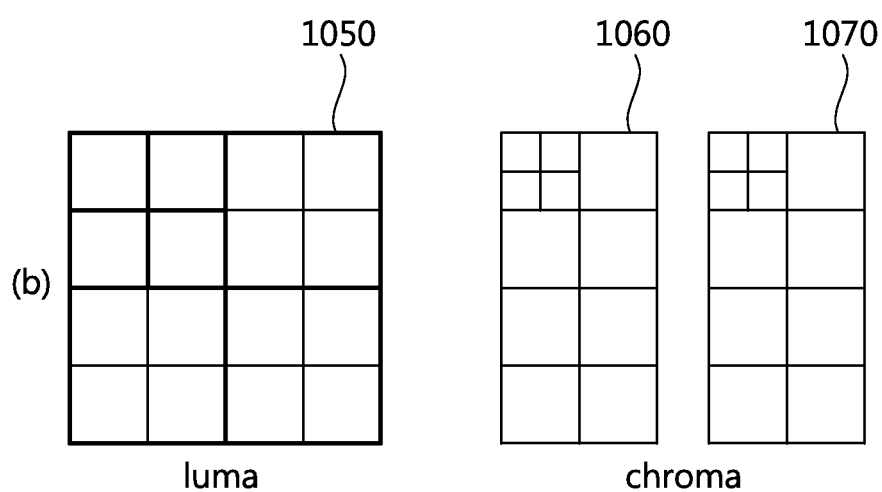
(b) luma / chroma

Combination of even lines

Combination of odd lines

METHOD FOR ENCODING/DECODING IMAGE, AND DEVICE USING SAME

This application is a U.S. National Phase Application under 35 U.S.C. §371 of International Application PCT/KR2013/011755, filed on Dec. 17, 2013, which claims the benefit of U.S. Provisional Application No. 61/737,828, filed on Dec. 17, 2012, and U.S. Provisional Application Nos. 61/752,977 filed on Jan. 16, 2013, the entire content of the prior applications is hereby incorporated by reference.

BACKGROUND OF THE INVENTION

Field of the Invention

The present invention relates to a method for encoding/decoding an image and a device using the same, and more particularly, to a coding technique for an image that includes a luma component and a chroma component.

Related Art

The need for images of high resolution and high quality has recently been increasing in various fields. As the resolution and quality of an image is improved, however, the amount of data in the image is also likewise increased.

Accordingly, if image data is transmitted using a medium such as an existing wired/wireless broadband line, or image data is stored using an existing storage medium, the costs of transmitting and storing data are also increased.

In order to effectively transmit, store, and play information within an image of high resolution and high quality, an image compression technology utilizing high efficiency can be used.

In order to improve image compression efficiency, inter-prediction and intra-prediction can be used. In the inter-prediction method, the pixel values within a current picture are predicted using as a reference the information found in other pictures. In the intra-prediction method, the pixel values of a current picture are predicted using the correlation between pixels within the same picture.

Various methods can be applied to make images be identical to the original images for a processing unit of predicted images, for example, a block. Through this, a decoding apparatus may decode the corresponding images more accurately (more exactly matches the original), and an encoding apparatus may encode the corresponding images to be more accurately restored.

Accordingly, researches how to regulate each of the processing units in a picture, how to configure and process a color component in a picture may be required.

SUMMARY OF THE INVENTION

An object of the present specification is to propose a method and apparatus for increasing compression efficiency in video encoding/decoding.

Another object of the present specification is to propose a method and apparatus for encoding/decoding for images of a chroma component that corresponds to a luma component.

Still another object of the present specification is to propose a method and apparatus for dividing images of a chroma component that corresponds to a luma component.

In an aspect, a method for decoding an image is provided. The method for decoding an image includes inducing a chroma component block corresponding to a luma component block based on chroma format information that indicates a chroma component sampling corresponding to a luma component sampling, partitioning the chroma component block into a transform block for the chroma component to transform the chroma component block based on partition information that represents whether a first block is partitioned into a second block for performing transform, and acquiring residual information of a transform block for the chroma component by performing at least one of inverse transform and dequantization based on the transform block for the chroma component.

In inducing the chroma component block, if the chroma format information indicates 4:2:2 chroma format and a size of the luma component block is 2N×2N, the chroma component block is induced to N×2N size.

Advantageous Effects

In encoding/decoding apparatus for performing sampling among chroma components according to chroma form, by applying a division process of a transform block that has a chroma component according to the present invention, a load of hardware implementation can be decreased and a normality of an expression can be increased.

Further, by enabling to effectively perform division for a non-square chroma block in addition to a square chroma block, processing efficiency for encoding and decoding can be increased.

BRIEF DESCRIPTION OF THE DRAWINGS

FIG. 9 and FIG. 10 illustrate examples of partition form of luma block and chroma block in 4:2:2 chroma format according to the embodiment of FIG. 8 described above.

DESCRIPTION OF EXEMPLARY EMBODIMENTS

Figure 1:
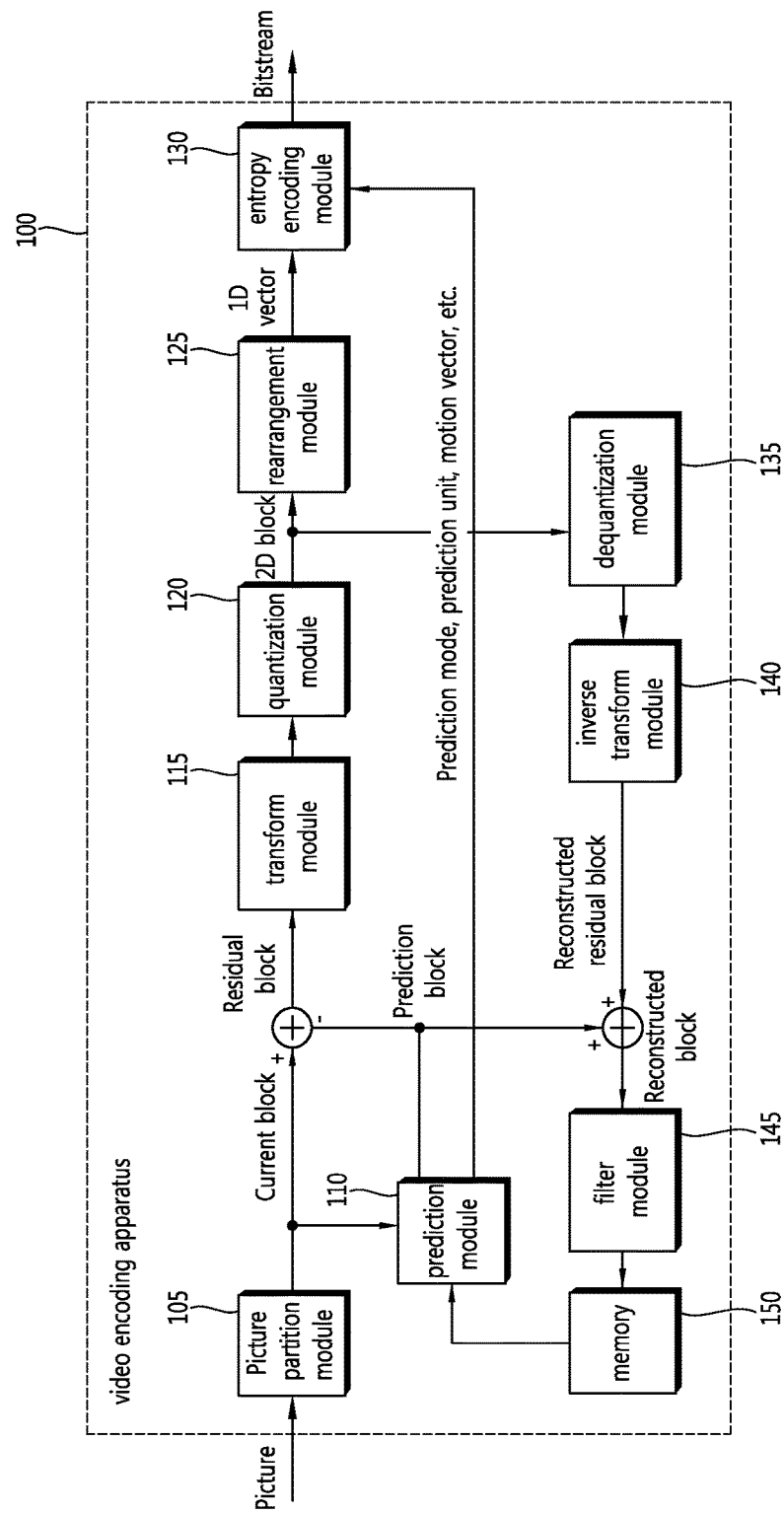
FIG. 1 is a block diagram schematically illustrating a video encoder according to an embodiment of the invention.

The present invention can be modified in various forms, and specific embodiments thereof will be described and shown in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding apparatus and does not mean that the elements are embodied by independent hardware or independent software. For example, two or more elements of the elements may be combined to form a single element, or one element may be divided into plural elements. The embodiments in which the elements are combined and/or divided belong to the scope of the invention without departing from the concept of the invention.

Hereinafter, exemplary embodiments of the invention will be described in detail with reference to the accompanying drawings. Like constituents in the drawings will be referenced by like reference numerals and will not be repeatedly described.

FIG. 1 is a block diagram schematically illustrating a video encoder according to an embodiment of the invention.

Referring to FIG. 1, a video encoder 100 includes a picture partitioning module 105, a prediction module 110, a transform module 115, a quantization module 120, a rearrangement module 125, an entropy encoding module 130, a dequantization module 135, an inverse transform module 140, a filtering module 145, and a memory 150.

The picture partitioning module 105 may partition an input picture into at least one process unit block. Here, a block as the process unit may be a prediction unit (hereinafter, referred to as a "PU"), a transform unit (hereinafter, referred to as a "TU"), or a coding unit (hereinafter, referred to as a "CU").

The process unit blocks partitioned by the picture partitioning module 105 may have a quad-tree structure.

The prediction module 110 includes an inter prediction module that performs an inter prediction process and an intra prediction module that performs an intra prediction process, as will be described later. The prediction module 110 performs a prediction process on the processing units of a picture divided by the picture dividing module 105 to create a prediction block. In the prediction module 110, the processing unit of a picture may be a CU, a TU, or a PU. The prediction module 110 may determine whether the prediction performed on the corresponding processing unit is an inter prediction or an intra prediction, and may determine specific details (for example, a prediction mode) of the prediction methods. The processing unit subjected to the prediction process may be different from the processing unit of which the prediction method and the specific details are determined. For example, the prediction method and the prediction mode may be determined in the units of PU and the prediction process may be performed in the units of TU.

In the inter prediction, a prediction process may be performed on the basis of information on at least one of a previous picture and/or a subsequent picture of a current picture to create a prediction block. In the intra prediction, a prediction process may be performed on the basis of pixel information of a current picture to create a prediction block.

In the inter prediction, a skip mode, a merge mode, an MVP (Motion Vector Prediction) mode, and the like may be used. In the inter prediction, a reference picture may be selected for a PU, and a reference block having the same size as the PU may be selected by integer pixel samples. Then, a prediction block in which a residual signal from the current PU is minimized and the motion vector magnitude is minimized is created.

The prediction block may be constructed in the unit of integer pixel samples or in the unit of pixel samples less than an integer pixel such as ½ pixel unit or ¼ pixel unit. Here, the motion vector may also be expressed in the unit of pixel samples less than an integer pixel.

Information such as an index, a motion vector (for example, a motion vector predictor), and a residual signal of a reference picture selected through the inter prediction is entropy-encoded and is transmitted to a decoder. When a skip mode is applied, a prediction block may be used as a reconstructed block and thus the residual signal may not be created, transformed, quantized, and transmitted at all.

When the intra prediction is performed, the prediction mode may be determined in the unit of PU and the prediction process may be performed in the unit of PU. Alternatively, the prediction mode may be determined in the unit of PU and the inter prediction may be performed in the unit of TU.

The prediction modes in the intra prediction may include 33 directional prediction modes and at least two non-directional modes. The non-directional modes may include a DC prediction mode and a planar mode.

In the intra prediction, a prediction block may be constructed after a filter is applied to a reference sample. At this time, it may be determined whether a filter should be applied to a reference sample depending on the intra prediction mode and/or the size of a current block.

A PU may be a block having various sizes and shapes. For example, in case of inter prediction, a PU may be blocks having sizes such as 2N×2N, 2N×N, N×2N, and N×N (where N is an integer). In case of intra prediction, a PU may be blocks having sizes such as 2N×2N and N×N (where N is an integer). A PU with a size of N×N may be set to be applied to only a specific case. For example, the PU with a size of N×N may be set to be used for only a smallest CU or may be set to be used for only the intra prediction. In addition to the PUs with the above-mentioned sizes, PUs such as an N×mN block, an mN×N block, a 2N×mN block, and an mN×2N block (where m<1) may be additionally defined and used.

Residual values (a residual block or a residual signal) between the constructed prediction block and the original block are input to the transform module 115. The prediction mode information, the motion vector information, and the like used for the prediction are encoded along with the residual values by the entropy encoding module 130 and are transmitted to the decoder.

The transform module 115 performs a transform process on the residual block in the unit of TUs and creates transform coefficients.

A transform block is a rectangular block of samples and is a block to which the same transform is applied. The transform block may be a TU and may have a quad-tree structure.

The transform module 115 may perform a transform process depending on the prediction mode applied to a residual block and the size of the block.

For example, when intra prediction is applied to a residual block and the residual block has an 4×4 array, the residual block is transformed using discrete sine transform (DST). Otherwise, the residual block may be transformed using discrete cosine transform (DCT).

The transform module 115 may construct a transform block of transform coefficients through the transform.

The quantization module 120 may quantize the residual values, that is, transform coefficients, transformed by the transform module 115 and may create quantization coefficients. The values calculated by the quantization module 120 may be supplied to the dequantization module 135 and the rearrangement module 125.

The rearrangement module 125 may rearrange the transform coefficients supplied from the quantization module 120. By rearranging the quantization coefficients, it is possible to enhance the encoding efficiency in the entropy encoding module 130.

The rearrangement module 125 may rearrange the quantized transform coefficients in the form of a two-dimensional block to the form of a one-dimensional vector through the use of a coefficient scanning method.

The entropy encoding module 130 may perform an entropy encoding operation on the quantization coefficients rearranged by the rearrangement module 125. Examples of the entropy encoding method include an exponential Golomb method, a CAVLC (Context-Adaptive Variable Length Coding) method, and a CABAC (Context-Adaptive Binary Arithmetic Coding) method. The entropy encoding module 130 may encode a variety of information such as quantization coefficient information and block type information of a CU, prediction mode information, partition unit information, PU information, transfer unit information, motion vector information, reference picture information, block interpolation information, and filtering information transmitted from the rearrangement module 125 and the prediction module 110.

The entropy encoding module 130 may give a predetermined change to a parameter set or syntaxes to be transmitted, if necessary.

The dequantization module 135 dequantizes the values (transform coefficients) quantized by the quantization module 120. The inverse transform module 140 inversely transforms the values dequantized by the dequantization module 135.

The residual values created by the dequantization module 135 and the inverse transform module 140 may be merged with the predicted block predicted by the prediction module 110 to construct a reconstructed block.

In FIG. 1, a residual block and a prediction block are added to create a reconstructed block by an adder. At this time, the adder may be considered as a particular module (reconstructed block creating module) that creates a reconstructed block.

The filtering module 145 applies a deblocking filter, an ALF (Adaptive Loop Filter), an SAO (Sample Adaptive Offset) to the reconstructed picture.

The deblocking filter removes a block distortion generated at the boundary between blocks in the reconstructed picture. The ALF performs a filtering process on the basis of the result values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

On the other hand, the filtering module 145 may not perform a filtering operation on the reconstructed block used in the inter prediction.

The memory 150 may store the reconstructed block or picture calculated by the filtering module 145. The reconstructed block or picture stored in the memory 150 may be supplied to the prediction module 110 that performs the inter prediction.

Figure 2:
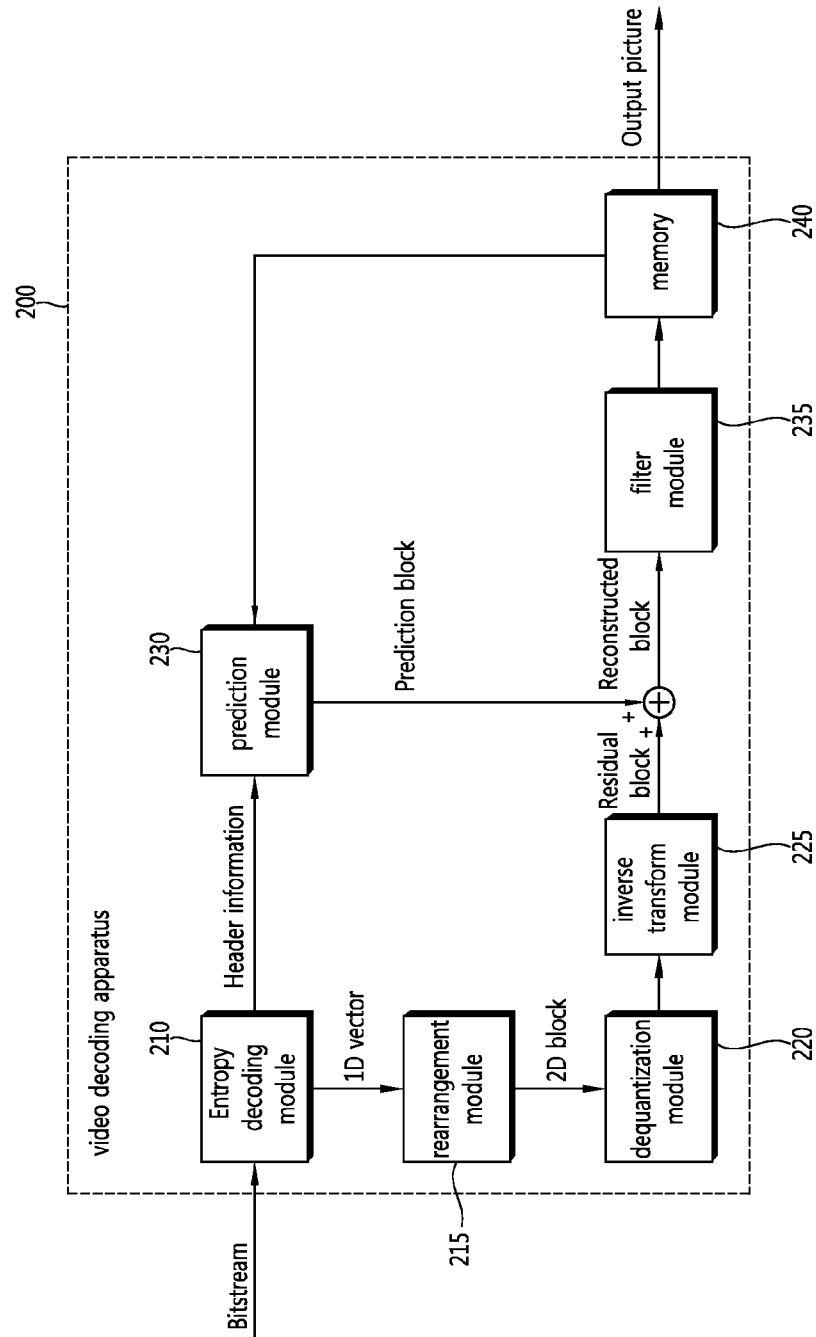
FIG. 2 is a block diagram schematically illustrating a video decoder according to an embodiment of the invention.

FIG. 2 is a block diagram schematically illustrating a video decoder according to an embodiment of the invention.

Referring to FIG. 2, a video decoder 200 may include an entropy decoding module 210, a rearrangement module 215, a dequantization module 220, an inverse transform module 225, a prediction module 230, a filtering module 235, and a memory 240.

When a video bitstream is input from the video encoder, the input bitstream may be decoded on the basis of the order in which video information is processed by the video encoder.

For example, when the video encoder uses a variable length coding (hereinafter, referred to as "VLC") method such as the CAVLC method to perform the entropy encoding operation, the entropy decoding module 210 may implement the same VLC table as the VLC table used in the video encoder and may perform the entropy decoding operation. When the video encoder uses the CABAC method to perform the entropy encoding process, the entropy decoding module 210 may perform the entropy decoding operation using the CABAC method to correspond thereto.

Information for constructing a predicted block out of the information decoded by the entropy decoding module 210 may be supplied to the prediction module 230, and the residual values, that is, the quantized transform coefficients, entropy-decoded by the entropy decoding module 210 may be input to the rearrangement module 215.

The rearrangement module 215 may rearrange the bitstream information, that is, the quantized transform coefficients, entropy-decoded by the entropy decoding module 210 on the basis of the rearrangement method in the video encoder.

The rearrangement module 215 may reconstruct and rearrange the coefficients expressed in the form of a one-dimensional vector into coefficients in the form of a two-dimensional block. The rearrangement module 215 may scan the coefficients on the basis of the prediction mode applied to the current block (transform block) and the size of the transform block and may create an array of coefficients (quantized transform coefficients) in the form of a two-dimensional block.

The dequantization module 220 may perform dequantization on the basis of the quantization parameters supplied from the video encoder and the coefficient values of the rearranged block.

The inverse transform module 225 may perform the inverse DCT and/or inverse DST of the DCT and/or DST, which has been performed by the transform module of the video encoder, on the quantization result from the video encoder.

The inverse transform may be performed on the basis of a transfer unit or a partition unit of a picture determined by the video encoder. The transform module of the video encoder may selectively perform the DCT and/or DST depending on plural information pieces such as the prediction method, the size of a current block, and the prediction direction, and the inverse transform module 225 of the video decoder may perform the inverse transform on the basis of the transform information on the transform performed by the transform module of the video encoder.

The prediction module 230 may construct a predicted block on the basis of prediction block construction information supplied from the entropy decoding module 210 and the previously-decoded block and/or picture information supplied from the memory 240.

When the prediction mode of a current CU and/or PU is an intra prediction mode, the prediction module 230 may perform an intra prediction operation of constructing a predicted block on the basis of pixel information of a current picture.

When the prediction mode for a current PU is the inter prediction mode, the prediction module 230 may perform the inter prediction operation on the current PU on the basis of information included in at least one of a previous picture and a subsequent picture of the current picture. At this time, motion information for the inter prediction of the current PU, for example, information on motion vectors and reference picture indices, supplied from the video encoder may be induced from a skip flag, a merge flag, and the like received from the video encoder.

The reconstructed block may be constructed using the predicted block constructed by the prediction module 230 and the residual block supplied from the inverse transform module 225. FIG. 2 illustrates that the residual block and the predicted block are added by an adder to construct a reconstructed block. Here, the adder may be considered as a particular module (reconstructed block constructing module) that constructs a reconstructed block.

When the skip mode is used, the residual signal may not be transmitted and the predicted block may be used as a reconstructed block.

The reconstructed block and/or picture may be supplied to the filtering module 235. The filtering module 235 may perform a deblocking filtering operation, an SAO operation, and/or an ALF operation on the reconstructed block and/or picture.

The memory 240 may store the reconstructed picture or block for use as a reference picture or a reference block and may supply the reconstructed picture to an output module.

The elements that is directly related to decoding images among the entropy decoding module 210, the rearrangement module 215, the dequantization module 220, the inverse transform module 225, the prediction module 230, the filtering module 235 and the memory 240 which are included in the decoding apparatus 200, for example, the entropy decoding module 210, the rearrangement module 215, the dequantization module 220, the inverse transform module 225, the prediction module 230, the filtering module 235, and so on may be expressed as a decoder or a decoding unit that is distinguished from other elements.

In addition, the decoding apparatus 200 may further include a parsing unit (not shown in the drawing) that parses information related to the encoded images included in a bitstream. The parsing unit may include the entropy decoding module 210, and may be included in the entropy decoding module 210. Such a parsing unit may also be implemented as an element of the decoding unit.

Figure 3:
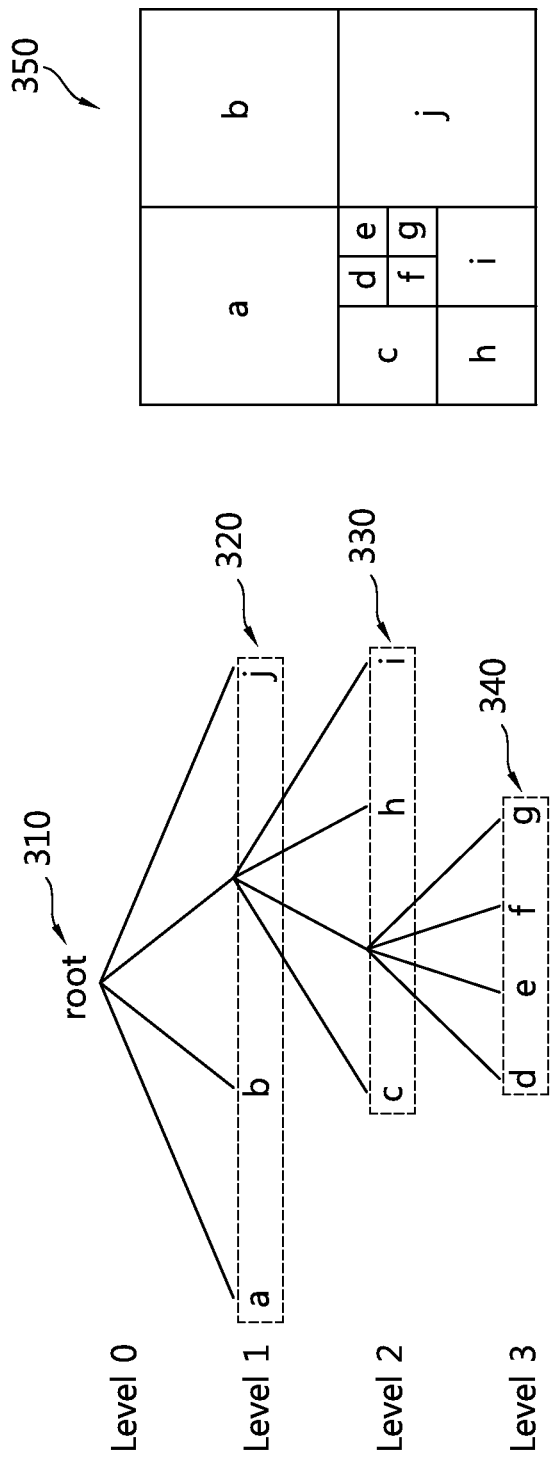
FIG. 3 is a diagram schematically illustrating an embodiment that one unit is partitioned into a plurality of subunits.

FIG. 3 is a diagram schematically illustrating an embodiment that one unit is partitioned into a plurality of subunits. In FIG. 3, a coding unit (CU) is exemplified and described for the convenience of description.

The coding unit means a basic unit for processing a picture in the above-mentioned course of processing images, for example, the course of intra/inter prediction, transform, quantization, and/or entropy coding. The size of a coding unit used in coding a picture may not be constant.

A coding unit may have a rectangular shape and a single coding unit may be partitioned into plural coding units. For example, a coding unit with a size of 2N×2N can be partitioned into four coding units with a size of N×N. Such partitioning of a coding unit can be recursively performed and all coding units do not need to be partitioned in the same shape. Here, for the purpose of convenience in the course of coding and processing, a maximum size or a minimum size of the coding unit may be restricted. When a maximum size of a coding unit is determined, it is referred to a maximum coding unit size, and when a minimum size of a coding unit is determined, it is referred to a minimum coding unit size.

Information representing whether a coding unit should be partitioned can be designated for each coding unit. For example, a block corresponding to the node can be partitioned into four blocks when the value of a flag representing the partitioning is 1, and a block is not partitioned any more, and processes can be performed on the coding unit when the value of the flag is 0.

The partitioned structure of the coding unit described above may be expressed using a tree structure. For example, a partition may be performed by using a picture or a coding unit with the maximum size as a root. A coding unit which is currently partitioned becomes a parent node, and a coding unit partitioned from the parent node becomes a child node. At the moment, the coding unit (parent node) which is currently partitioned has the child nodes as much as the number of partitioned coding unit. And the coding unit no more partitioned becomes a leaf node. The leaf node is called a node that does not have a child node.

Assuming that a square division is performed for one coding unit, since one coding unit may be partitioned into four lower coding units at maximum, the division structure of coding unit may be a Quad tree structure.

Hereinafter, in the present specification, for the convenience of description, a coding unit that has the maximum coding unit size is referred to a largest coding unit (LCU), and a coding unit that has the minimum coding unit size is referred to a smallest coding unit (SCU).

An encoder determines the largest and smallest coding unit sizes depending on characteristics (such as a resolution) of a video image or in consideration of coding efficiency, and information thereon or information capable of deriving the sizes may be included in a bitstream. In addition, the coding unit that has the tree structure may be partitioned in a hierarchical manner with depth information. Each lower unit which is partitioned may have the depth information. Since the depth information represents the number and/or the degree of a unit being partitioned, the depth information may include information of a size of lower unit.

For example, assuming that the maximum size of a coding unit and the maximum depth of a tree can be defined and square partitioning is performed, the size of a coding unit is half the size of a coding unit of a parent node, and it is thus available to acquire the minimum size of a coding unit by using the maximum size of a coding unit and the maximum depth information. Inversely, if the minimum size of coding units and the maximum depth of a tree are predefined, the maximum size of coding units can be derived and used. Since the size of a unit in square partitioning may be obtained in the form of multiple of 2, the actual size of a coding unit may be transmitted by being expressed as a logarithmic value to base 2, thereby enhancing transmission efficiency.

A decoder may acquire partition information on whether a current coding unit is partitioned. By acquiring the partition information under specific conditions or transmitting such information only under specific conditions in an encoder, the encoding/decoding efficiency can be enhanced. For example, if the current coding unit is the smallest coding unit (SCU), the coding unit is not partitioned into smaller coding unit any more, and in this situation, it is not required to acquire the partition information.

Referring to FIG. 3, a highest coding unit 310 may be called a root node, and does not have a parent node. Accordingly, the highest coding unit 310 is a unit which is not partitioned from a coding unit which is higher than it, and may be the largest coding unit (LCU). For example, the highest coding unit 310 may have the smallest depth value.

The highest coding unit 310 may be partitioned in a quad tree form. As a result, four lower coding units 320 that have a depth of level 1 may be generated. Here, at least one lower coding unit among the lower coding units 320 that have a depth of level 1 may be partitioned in a quad tree form, or may not be partitioned any more. That is, based on the highest coding unit 310, a coding unit may be recursively partitioned in a quad tree form until it reaches to the maximum depth (or maximum level) of the coding unit.

For example, as shown in FIG. 3, when a maximum allowable depth of a coding unit is level 3, the highest coding unit 310 may be recursively partitioned in a quad tree form up to a depth of level 3 and lower coding units 320, 330 and 340 may be generated. Here, the lower coding units 320, 330 and 340 are partitioned within the highest coding unit (that is, one LCU), and may have the partitioned form shown as reference numeral 350 in FIG. 3.

In the embodiment of FIG. 3 described above, although a partitioning process of a coding unit is described as an example, the quad tree structure described above may also be applied to a partitioning process of a transform unit which is a basic unit of performing the transformation. That is, the transform unit may be partitioned in a quad tree form within a coding unit (leaf node) that is not partitioned any more.

Meanwhile, a picture includes one or more pixels or arrays of sample, and one pixel (or sample) includes a color component which is an element that forms a color space. The color component may include red (R), green (G) and blue (B) that represents the three primary colors of light, and may also include a luma component and a chroma component. The luma component is a component that represents brightness of screen and denoted by Y, and the chroma component is a component that represents color of screen and denoted by U and V, or Cb and Cr, or Cg and Co.

For example, a picture may include only a luma (Y or monochrome) component. Or, a picture may include one luma component and two color components (YUV or YCbCr or YCgCo). Or, a picture may include R, G and B components.

According to the representation method of chroma components described above, a chroma format or a chroma format may be defined. For example, in case of including only sample arrays of luma components, a monochrome chroma format may be defined. In case of including one luma component and two chroma components, 4:2:0, 4:2:2 and 4:4:4 chroma formats may be defined according to sample arrays of the chroma component that corresponds to the sample arrays of luma components. If the sample arrays of chroma components is ½ of horizontal and vertical sample arrays of luma components, 4:2:0 chroma format may be defined. If the sample arrays of chroma components is identical to the vertical sample array of the luma components and is ½ of the horizontal sample arrays of luminous components, 4:2:2 chroma format may be defined. If the sample arrays of chroma components is identical to the horizontal and vertical sample arrays of luma components, 4:4:4 chroma format may be defined.

The encoder/decoder encodes/decodes a picture by performing sampling among color components according to the chroma format. In other words, the encoder may perform sampling of chroma components corresponding to the luma component sampling when encoding a picture, and the decoder may decode a picture according to the sampling (chroma format) among the color components used when performing encoding. Accordingly, the decoder requires information of the chroma components which are used when performing encoding. Such information of chroma components may be signaled from the encoder using syntax.

For example, in case of expressing a picture using one luma component and two chroma components, the information of chroma format may be information representing monochrome, 4:2:0, 4:2:2 and 4:4:4 chroma formats according to the sample arrays of the chroma components that correspond to the sample array of luma component. For example, one of monochrome, 4:2:0, 4:2:2 and 4:4:4 chroma formats may be indicated using syntax such as chroma_format_idc.

Table 1 represents an example that specifies a chroma format using chroma_format_idc.

TABLE 1

| chroma_format_idc | separate_colour_plane_flag | Chroma format | SubWidthC | SubHeightC |
| --- | --- | --- | --- | --- |
| 0 | 0 | monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

Referring to Table 1, if chroma_format_idc value is 1, the monochrome chroma format may be indicated, and if chroma_format_idc value is 1, 4:2:0 chroma format may be indicated. Also, if chroma_format_idc value is 2, 4:2:2 chroma format may be indicated, and if chroma_format_idc value is 3, 4:4:4 chroma format may be indicated.

As described above, in case that a chroma format is not 4:2:0 format, a size of transform unit for chroma component is less than a half of horizontal and vertical size of the transform unit for luma component. That is, in case that a chroma format is 4:4:4, since the sample array of chroma component is identical to the sample array of luma component, a size of coding unit for chroma component is identical to a size of coding unit for luma component. In this case, the coding unit for chroma and luma components has an identical partition depth (or level) when the coding unit is partitioned into transform units for performing transformation, a size of transform unit for chroma component may be maintained to be identical to a size of transform unit for luma component. In case that a chroma format is 4:2:2, since the sample array of chroma component is down sampled to ½ in horizontal direction of the sample array of luma component, a size of coding unit for chroma component is a half of the horizontal size of a coding unit for luma component.

Hereinafter, in the present specification, for the convenience of description, a transform unit for chroma (or luma) component may be represented as a terminology such as a chroma (or luma) component transform unit, a chroma (or luma) transform unit, a chroma (or luma) component block, a chroma (or luma) block, and so on. In addition, a coding unit for chroma (or luma) component may also be represented as a terminology such as a chroma (or luma) component coding unit, a chroma (or luma) coding unit, a chroma (or luma) component block, a chroma (or luma) block, and so on.

Figure 4:
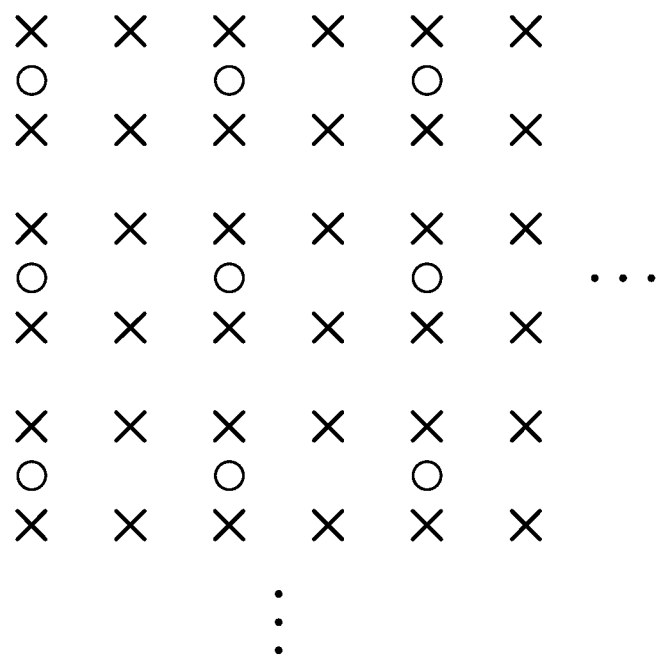
FIG. 4 is a diagram illustrating 4:2:0 chroma format.

FIG. 4 is a diagram illustrating 4:2:0 chroma format.

In FIG. 4, it is shown that vertical and horizontal directional positions of sample of luma component (or luma sample) and sample of chroma component (or chroma sample) in 4:2:0 chroma format. At the moment, the number of chroma samples that correspond to the luma samples is ½ of sample numbers in vertical direction and horizontal direction of luma samples.

Figure 5:
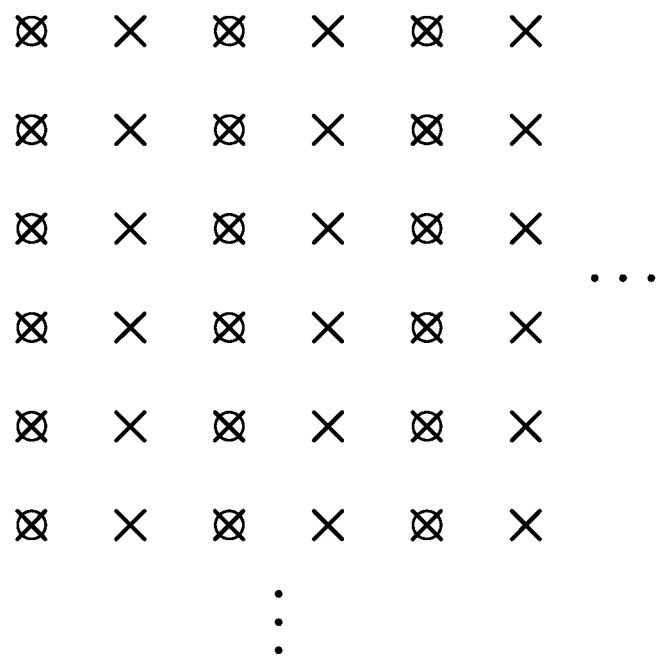
FIG. 5 is a diagram illustrating 4:2:2 chroma format.

FIG. 5 is a diagram illustrating 4:2:2 chroma format.

In FIG. 5, it is shown that vertical and horizontal directional positions of sample of luma component (or luma sample) and sample of chroma component (or chroma sample) in 4:2:2 chroma format. At the moment, the number of chroma samples in vertical direction that correspond to the luma samples is identical to the sample number in vertical direction of the luma sample, and the number of chroma samples in horizontal direction that correspond to the luma samples is ½ of sample numbers in horizontal direction of luma samples.

Figure 6:
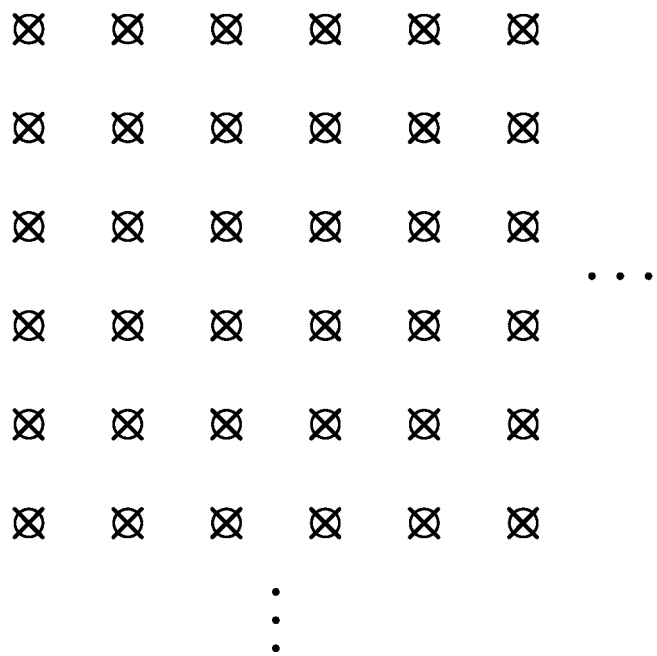
FIG. 6 is a diagram illustrating 4:4:4 chroma format.

FIG. 6 is a diagram illustrating 4:4:4 chroma format.

In FIG. 6, it is shown that vertical and horizontal directional positions of sample of luma component (or luma sample) and sample of chroma component (or chroma sample) in 4:2:0 chroma format. At the moment, the number of chroma samples that correspond to the luma samples is identical to the sample numbers in vertical direction and horizontal direction of luma samples.

In 4:2:2 chroma format shown in FIG. 5, in case that the chroma and luma coding units are partitioned into transform units with the same partition depth, the luma transform unit may have a size of square, and the chroma transform unit for the square luma transform unit may have a size of rectangle.

Figure 7:
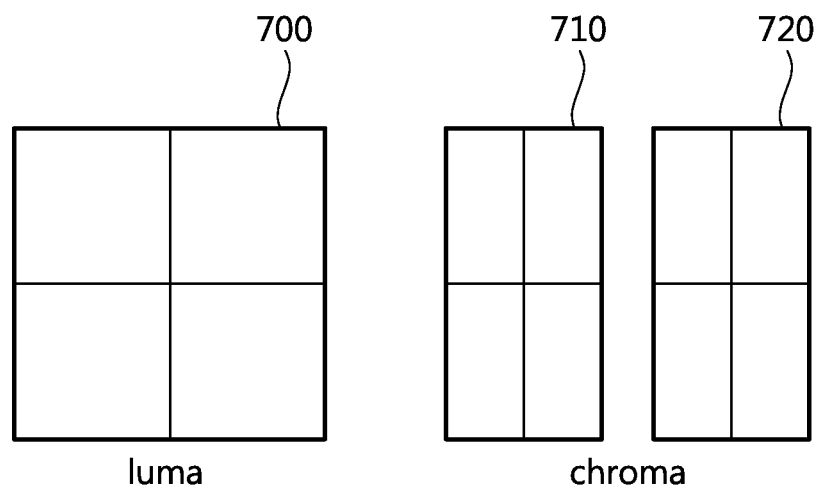
FIG. 7 illustrates an example of a partition form of luma transform unit and chroma transform unit in 4:2:2 chroma format.

FIG. 7 illustrates an example of a partition form of luma transform unit and chroma transform unit in 4:2:2 chroma format.

Referring to FIG. 7, when a luma transform unit 700 has a size of 2N×2N (square size) in 4:2:2 chroma format, chroma transform units 710 and 720 may have a size of N×2N (rectangle size). Here, the chroma transform unit 710 may be a block for Cb chroma component and the chroma transform unit 720 is a block for Cr chroma component.

In case that the luma transform unit 700 is partitioned into four lower transform units, as shown FIG. 7, the luma transform unit 700 may be partitioned into four lower transform units of N×N size in a quad tree form. At the moment, if partition depth of the chroma transform units 710 and 720 that correspond to the luma transform unit 700 is identical to a partition depth of the luma transform unit 700, the chroma transform units 710 and 720 also maintains the quad tree form, and may be partitioned into four lower transform units of rectangle size, as shown in FIG. 7.

The transform unit (or coding unit) of the rectangle size described above may be a load in hardware implementation in its own form. In addition, the encoder and the decoder that support 4:2:2 chroma format should necessarily support 4:2:0 chroma format. Accordingly, in order to maintain consistency with a basic structure of a codec (for example, high efficiency video coding: HEVC) that supports 4:2:0 chroma format, additional hardware implementation may be required. Hereinafter, in the present invention, a method that may support 4:2:2 chroma format without additional load such as hardware implementation will be described.

Figure 8:
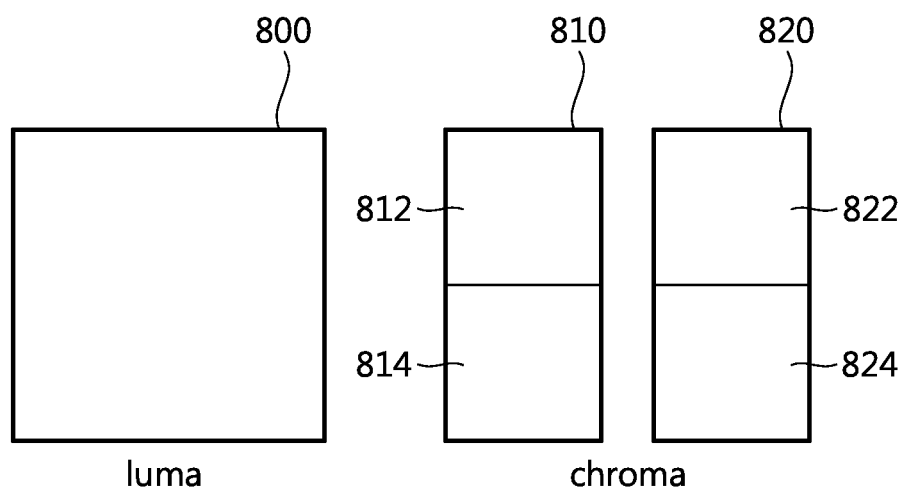
FIG. 8 is a diagram for describing a partition process of luma block and chroma block in 4:2:2 according to an embodiment of the present invention.

FIG. 8 is a diagram for describing a partition process of luma block and chroma block in 4:2:2 according to an embodiment of the present invention.

Referring to FIG. 8, when a luma block 800 has a size of 2N×2N (square size) in 4:2:2 chroma format, chroma blocks 810 and 820 that correspond to the luma block 800 may have a size of N×2N (rectangle size). Here, the chroma block 810 may be a block for Cb chroma component and the chroma block 820 is a block for Cr chroma component.

At the moment, in order to increase normality in hardware implementation and expression and to increase process efficiency in encoding/decoding process, a method of applying a square shaped block twice for the chroma blocks 810 and 820 of N×2N size may be used. That is, the chroma blocks 810 and 820 of N×2N size may be arranged with a square shaped block of two N×N sizes.

Figure 9:
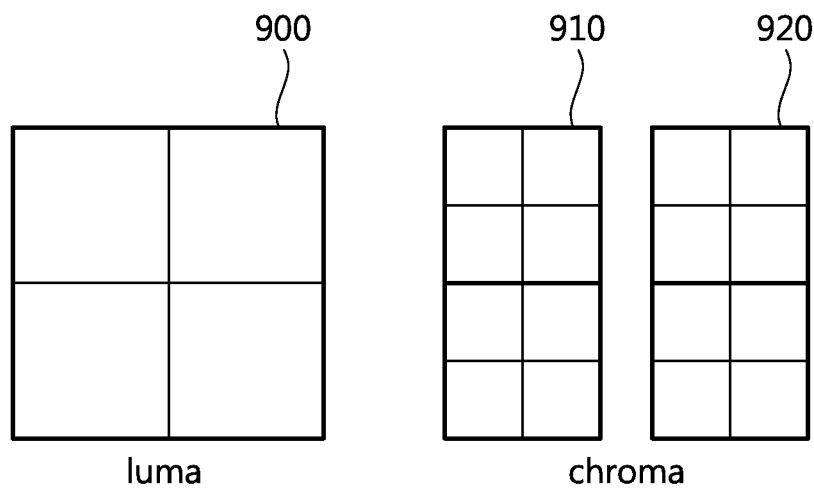

For example, in case that the chroma blocks 810 and 820 of N×2N size are partitioned in a quad tree form in order to perform the transformation, the chroma blocks 810 and 820 of N×2N size may be partitioned into a first transform blocks 812 and 822 and a second transform blocks 814 and 824 of N×N size, first. And the first transform blocks 812 and 822 and the second transform blocks 814 and 824 may be recursively partitioned in a quad tree form based on each of partition information. At the moment, a partition form for the first transform blocks 812 and 822 and the second transform blocks 814 and 824 may be a quad tree structure as shown in the embodiments of FIG. 9 and FIG. 10.

Here, the partition information may be information indicating whether the first block is partitioned into four second blocks, and split_transform_flag information may be used for the partition information used in the process of performing transformation, for example. If the split_transform_flag value is 0, it means that the first block is not partitioned into four second blocks, and if the split_transform_flag value is 1, it means that the first block is partitioned into four second blocks.

In case of performing transformation without the chroma blocks 810 and 820 of N×2N size being partitioned, for example, if the partition information, the split_transform_flag value is 0, for the chroma blocks 810 and 820 of N×2N size, transform coefficient information for the chroma blocks 810 and 820 of N×2N size may be acquired. At the moment, the transform coefficient information for the chroma blocks 810 and 820 of N×2N size includes the transform coefficient information for the first transform blocks 812 and 822 and the transform coefficient information for the second transform blocks 814 and 824.

Here, the transform coefficient information may be information that represents whether the transform block includes one or more transform coefficients but not zero. For example, the transform coefficient information may be represented using a flag. The transform coefficient information for the Cb chroma component may be represented as cbf_cb flag value, and the transform coefficient information for the Cr chroma component may be represented as cbf_cr flag value.

As described above, according to the embodiment of FIG. 8, it can be known that the chroma blocks 810 and 820 of N×2N size are used as a processing unit for transformation with being arranged with two chroma blocks of N×N size.

FIG. 9 and FIG. 10 illustrate examples of partition form of luma block and chroma block in 4:2:2 chroma format according to the embodiment of FIG. 8 described above.

The embodiment of FIG. 9 shows the case that a luma block 900 and chroma blocks 910 and 920 in 4:2:2 chroma format are partitioned with the same partition depth, in other words, the case that the chroma blocks 910 and 920 are partitioned identically to the partition form for transformation of the luma block 900. Here, the chroma block 910 may be a block for the Cb chroma component, and the chroma block 920 may be a block for the Cr chroma component.

For example, when the luma block 900 is partitioned into four transform blocks in a quad tree form, the chroma blocks 910 and 920 may be partitioned in a quad tree form. At the moment, as described above in FIG. 8, the chroma blocks 910 and 920 may include two square shaped chroma blocks and recursively partitioned in a quad tree form for each of the two square shaped chroma blocks.

The embodiment of FIG. 10 shows a partition form for a chroma block that corresponds to a luma block, in case that the transform blocks included in a luma block in 4:2:2 chroma format are partitioned with partition depths different from each other.

As shown in FIG. 10(a), when the transform blocks included in a luma block 1000 are partitioned with different partition depth with each other, the transform blocks included in the chroma blocks 1010 and 1020 may also be partitioned with the same partition depth with the transform blocks of the luma block 1000. That is, each of the transform blocks included in the luma block 1000 and the chroma blocks 1010 and 1020 may be partitioned in the same form. Here, the chroma block 1010 may be a block for the Cb chroma component, and the chroma block 1020 may be a block for the Cr chroma component.

For example, when the chroma blocks 1010 and 1020 of N×2N size that correspond to the luma block 1000 of 2N×2N size are arranged with a first chroma block and a second chroma block of N×N size, each of the first chroma block and the second chroma block may be recursively partitioned in a quad tree form so as to include the transform blocks that have the partition depth of the transform blocks included in the luma block 1000 and the same partition depth.

Or, as shown in FIG. 10(b), when the transform blocks included in a luma block 1050 are partitioned with different partition depth with each other, the transform blocks may be partitioned with the same partition form of transform block only in the positions of chroma blocks 1060 and 1070 that correspond to the luma block 1050. Here, the chroma block 1060 may be a block for the Cb chroma component, and the chroma block 1070 may be a block for the Cr chroma component.

For example, when the chroma blocks 1060 and 1070 of N×2N size that correspond to the luma block 1050 of 2N×2N size are arranged with a first chroma block and a second chroma block of N×N size, the positions of chroma blocks 1060 and 1070 that correspond to the luma block 1050 may be the first chroma block arranged at an upper end. The first block arranged at the upper end may be partitioned so as to include the transform blocks that have a partition depth which is identical to a partition depth of the transform blocks included in the luma block 1050.

Figure 11:
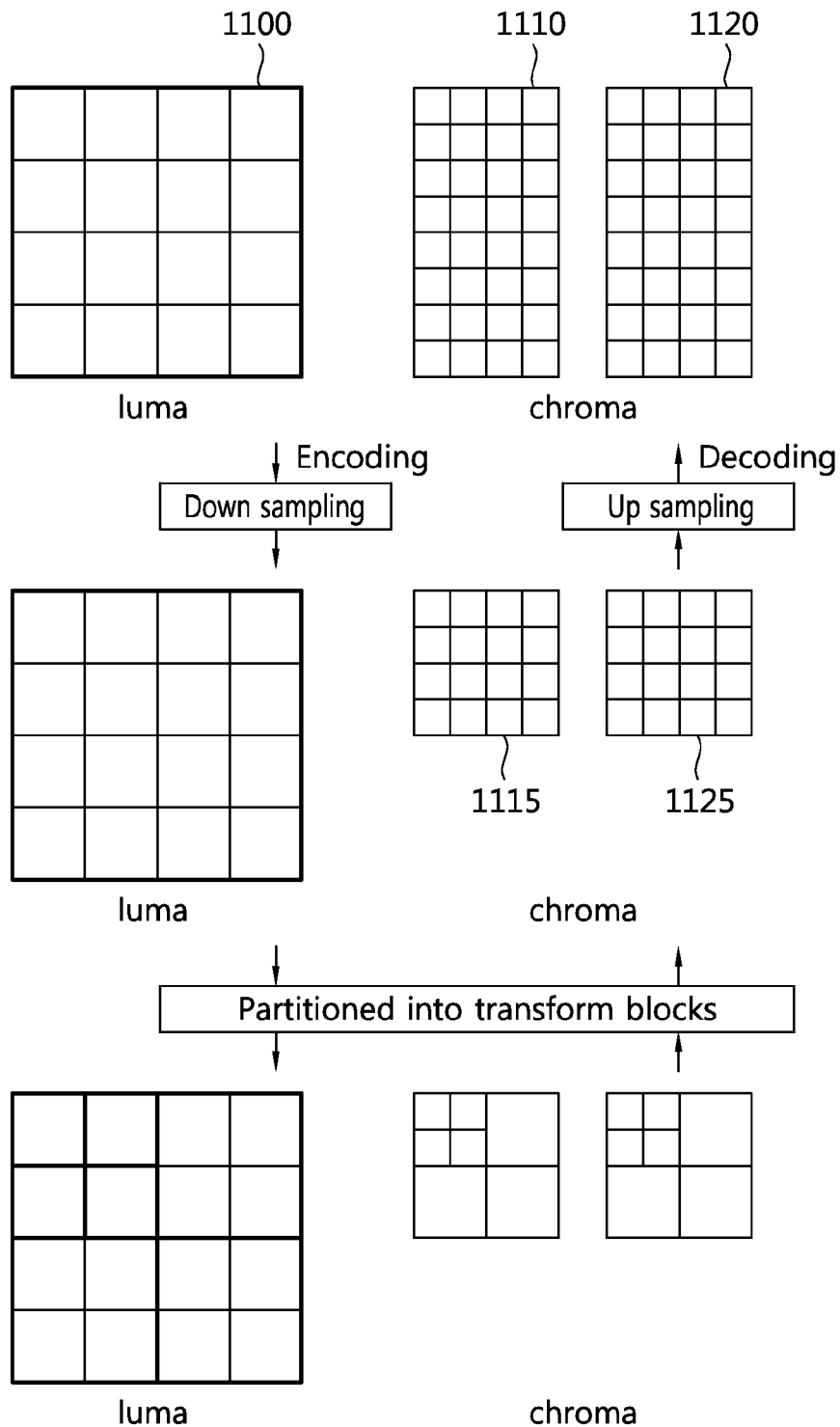
FIG. 11 is a diagram for describing a partition process of luma block and chroma block in 4:2:2 chroma format according to another embodiment of the present invention.

FIG. 11 is a diagram for describing a partition process of luma block and chroma block in 4:2:2 chroma format according to another embodiment of the present invention.

Referring to FIG. 11, when a luma block 1100 has a size of 2N×2N (square size) in 4:2:2 chroma format, chroma blocks 1110 and 1120 that correspond to the luma block 1100 may have a size of N×2N (rectangle size). Here, the chroma block 1110 may be a block for Cb chroma component and the chroma block 1120 is a block for Cr chroma component.

An encoder may make chroma blocks 1115 and 1125 of N×N size by down sampling the chroma blocks 1110 and 1120 that correspond to the luma block 1100. Then, since the size of chroma block becomes the same as that of 4:2:0 chroma format, the chroma blocks 1115 and 1125 of N×N size may be encoded in the same method as that of 4:2:0 chroma format. That is, like 4:2:0 chroma format, the encoder may perform the encoding process for the chroma blocks 1115 and 1125 of N×N size that correspond to the luma block 1100 of 2N×2N size.

A decoder, like 4:2:0 chroma format, may perform the decoding process for the chroma blocks 1115 and 1125 of N×N size that correspond to the luma block 1100 of 2N×2N size, and may make chroma blocks 1110 and 1120 of N×2N size by up sampling the chroma blocks 1115 and 1125 of N×N size.

Figure 12:
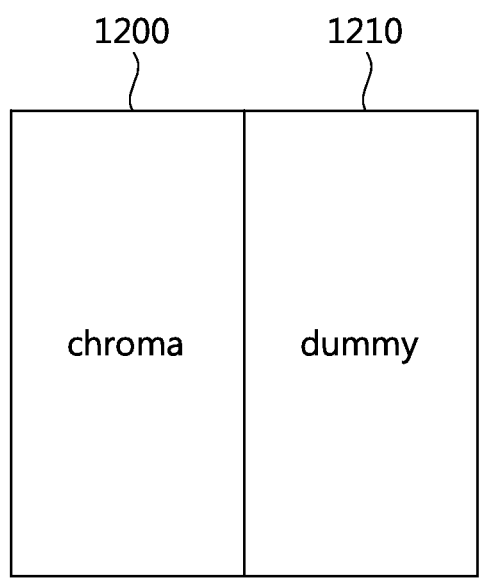
FIG. 12 is a diagram for describing a partition process of luma block and chroma block in 4:2:2 chroma format according to yet another embodiment of the present invention.

FIG. 12 is a diagram for describing a partition process of luma block and chroma block in 4:2:2 chroma format according to yet another embodiment of the present invention.

Referring to FIG. 12, when a luma block has a size of 2N×2N (square size) in 4:2:2 chroma format, a chroma block 1200 that corresponds to the luma block may have a size of N×2N (rectangle size).

At the moment, a method may be used such that the chroma block 1200 of a size of N×2N is magnified to 2N×2N size and reduced again after performing encoding/decoding process. As the method of magnifying the block to 2N×2N size, a padding method may be used, not general concept of up sampling and down sampling.

For example, as shown in FIG. 12, a dummy block 1210 of N×2N size may be added to the chroma block 1200 of N×2N size and be reconstructed to a chroma block of 2N×2N size. Here, the dummy block is a block that does not influence in encoding or decoding process, and may be a block configured as, for example, zero value.

Figure 13:
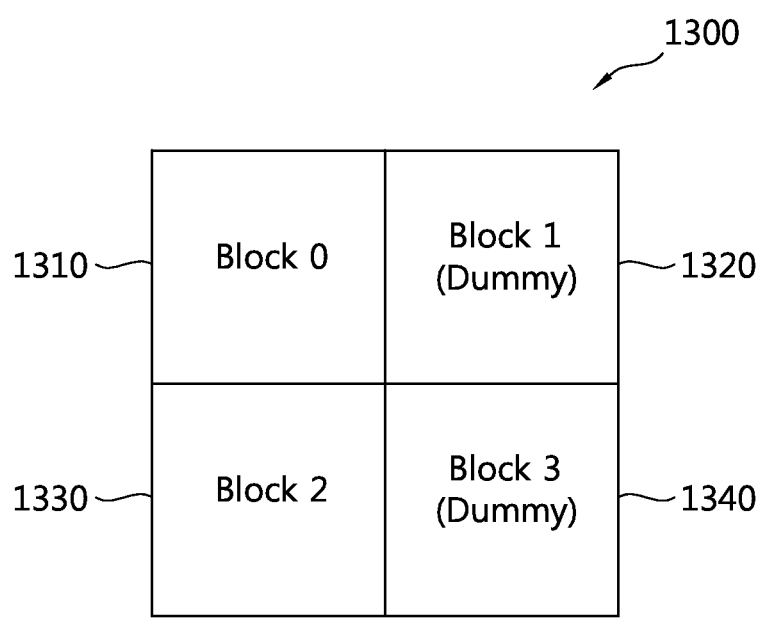
FIG. 13 is a diagram illustrating a partition form of chroma block in 4:2:2 chroma format according to the embodiment of FIG. 12 described above.

FIG. 13 is a diagram illustrating a partition form of chroma block in 4:2:2 chroma format according to the embodiment of FIG. 12 described above.

As described in FIG. 12 above, in case of the chroma block 1200 of N×2N size is reconstructed to a chroma block of 2N×2N size through a padding, the chroma block of 2N×2N size may be encoded/decoded like the chroma component block in general 4:4:4 chroma format.

As described above, in case of a chroma block 1300 of 2N×2N size which is reconstructed by adding (padding) dummy blocks 1320 and 1340, in order not to use the added dummy information (for example, zero value), a partition depth may be increased once (one level) in the partition process of transform block.

For example, as shown in FIG. 13, the chroma block 1300 of 2N×2N size including the dummy blocks 1320 and 1340 may always be processed after being constructed as four transform blocks 1310, 1320, 1330 and 1340 by being partitioned once with a quad tree form. At the moment, since transform block 0 1310 and transform block 2 1330 are blocks that have chroma components, general transformation and the related process may be progressed. And since transform block 1 1320 and transform block 3 1340 are blocks that have dummy information, the transformation may not be performed by regarding all information as zero. Accordingly, all information related to the transformation, for example, transform coefficient information (cbf), partition information (split_transform_flag), transform coefficient, and so on may not be transmitted in the encoder.

The method described above in FIG. 12 and FIG. 13 has advantages of decreasing difference in hardware implementation between 4:2:2 chroma format and 4:4:4 chroma format, and increasing normality in implementation and expression.

Figure 14:
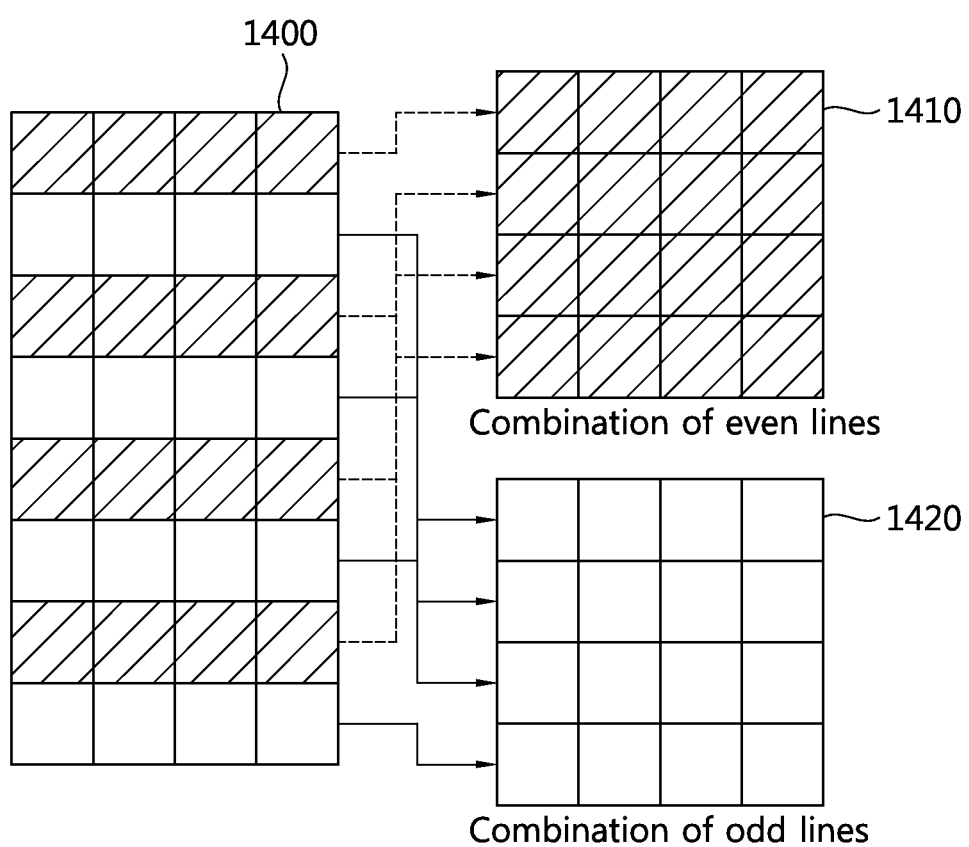
FIG. 14 is a diagram for describing a partition process of luma block and chroma block in 4:2:2 chroma format according to yet another embodiment of the present invention.

FIG. 14 is a diagram for describing a partition process of luma block and chroma block in 4:2:2 chroma format according to yet another embodiment of the present invention.

Referring to FIG. 14, when a luma block has a size of 2N×2N (square size) in 4:2:2 chroma format, a chroma block 1400 that corresponds to the luma block may have a size of N×2N (rectangle size).

At the moment, an encoder may recombine the chroma block 1400 of N×2N size in an interlace method and construct two chroma blocks 1410 and 1420 of N×N size. Then, each of the chroma blocks 1410 and 1420 of N×N size may be encoded with the same way of 4:2:0 chroma format. Here, the interlace method refers to a technique that may compress a picture by separating to two fields, for example, even and odd line fields.

For example, a first chroma block 1410 of N×N size may be constructed by samples located in even lines within the chroma block 1400 of N×2N size, and a second chroma block 1420 of N×N size may be constructed by samples located in odd lines within the chroma block 1400 of N×2N size.

The decoder, after performing decoding process for the two chroma blocks 1410 and 1420 of N×N size in the same way of 4:2:0 chroma format, may construct the chroma block 1400 of N×2N size by combining two chroma blocks 1410 and 1420 of N×N size in the original format.

As described above, when the chroma block 1400 of N×2N size is formed by the first chroma block 1410 of N×N size which is combined with samples at the even lines and the second chroma block 1420 of N×N size which is combined with samples at the odd lines, the first chroma block 1410 and the second chroma block 1420 include similar information to the chroma block 1400 of N×2N size on the whole. In addition, it requires much less computation load in comparison with the case of encoding by down sampling and decoding by up sampling the chroma block 1400 of N×2N size, and loss information may also be decreased. In addition, since the first chroma block 1410 and the second chroma block 1420 which are constructed by the interlace method have the similar tendency with the chroma block 1400 of N×2N size, even though it is partitioned to transform blocks with the same way as the luma blocks, a degree of deviating actual picture information (error) may be decreased.

Figure 15:
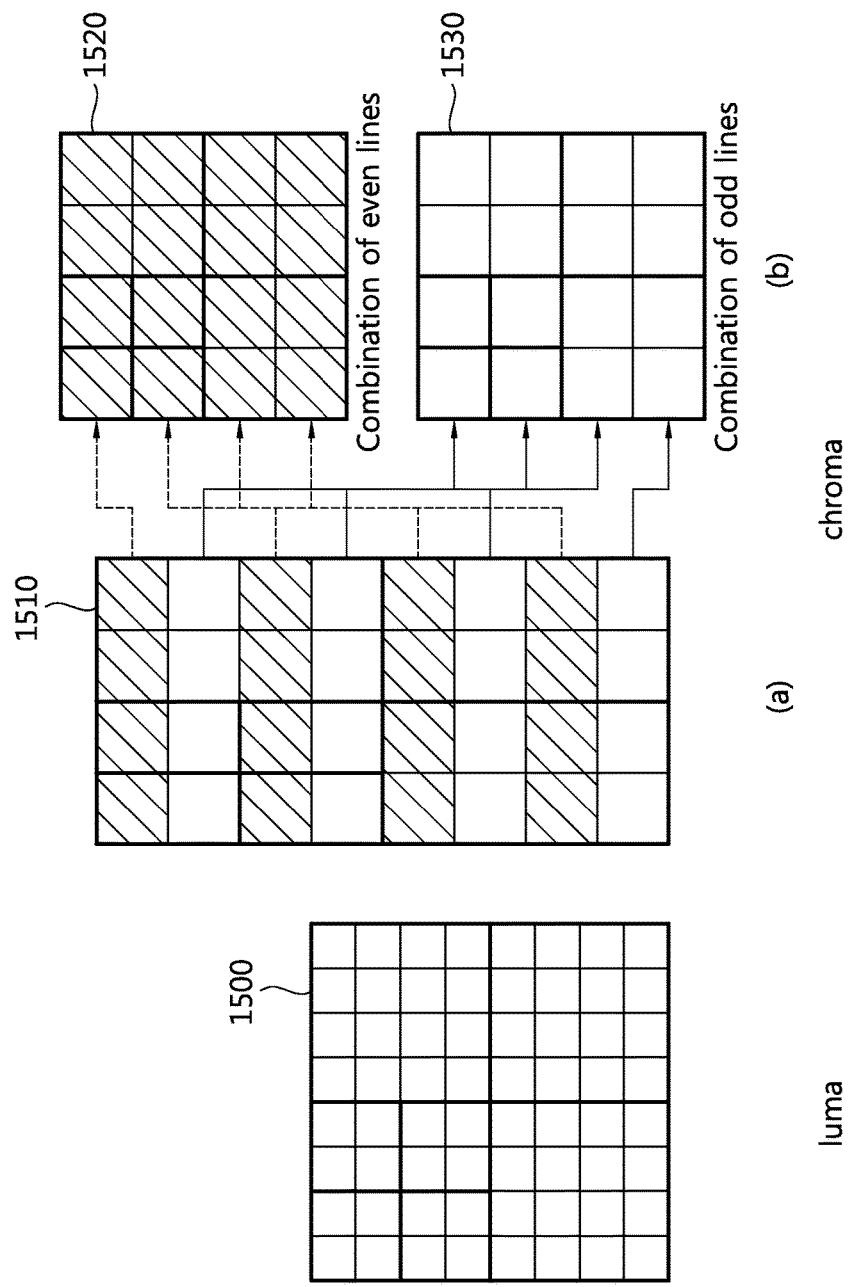
FIG. 15 is a diagram illustrating a partition form of chroma block in 4:2:2 chroma format according to the embodiment of FIG. 14 described above.

FIG. 15 is a diagram illustrating a partition form of chroma block in 4:2:2 chroma format according to the embodiment of FIG. 14 described above.

In case that a luma block 1500 of 2N×2N size is partitioned and include transform blocks in the same form shown in FIG. 15, if a chroma block 1510 of N×2N size that corresponds to the luma block 1500 of 2N×2N size is also partitioned with the same partition depth (partition information), it is reasonable to be partitioned with the partition form shown in FIG. 15(*a*).

However, if the size of transform block for chroma component is restricted to square shape, as shown in the embodiment of FIG. 14, the chroma block 1510 of N×2N size includes a first chroma block 1520 of N×N size which is combined by samples at even lines and a second chroma block 1530 of N×N size which is combined by samples at odd lines, and then, as shown in FIG. 15(*b*), may be partitioned into square sized transform blocks for each of the first chroma block 1520 and the second chroma block 1530.

Figure 16:
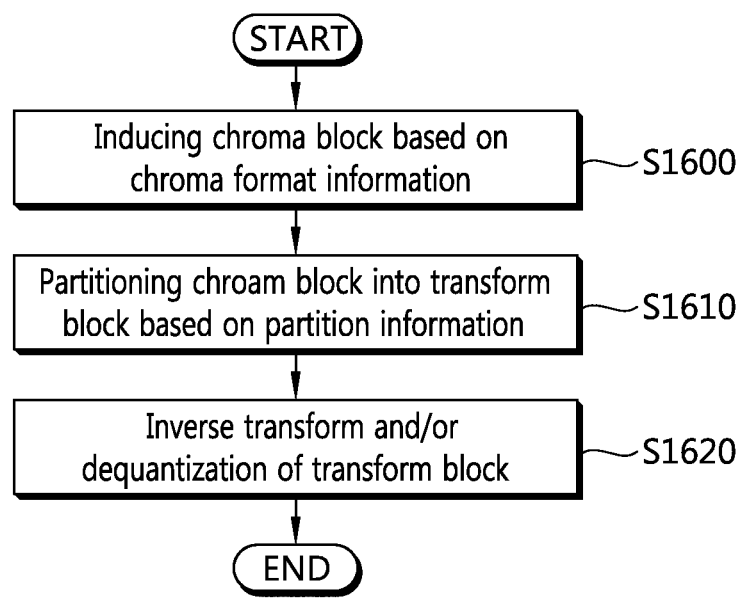
FIG. 16 is a flow chart schematically illustrating a decoding method for chroma blocks according to an embodiment of the present invention.

FIG. 16 is a flow chart schematically illustrating a decoding method for chroma blocks according to an embodiment of the present invention. The method of FIG. 16 may be performed in the decoder of FIG. 2.

Referring to FIG. 16, based on chroma format information, the decoder may induce chroma blocks that have chroma components corresponding to luma blocks that have luma components (step, S1600).

As described above, the chroma format information may be information that indicates a chroma component sampling corresponding to a luma component sampling. For example, in case of expressing a picture using one luma component and two chroma components, the chroma format information may be information (for example, chroma_format_idc) that indicates one of monochrome, 4:2:0, 4:2:2, 4:4:4 chroma formats according to the sample arrangement of chroma components corresponding to the sample arrangement of luma component.

If the chroma format information indicates 4:2:2 chroma format, the chroma block corresponding to the luma block of 2N×2N size may be induced by a block of N×2N size. That is, a horizontal length of the chroma block may be identical to a vertical length of the luma block, and a horizontal length of the chroma block may be ½ of the horizontal length of the luma block.

The decoder may perform partition into transform blocks based on the partition information for performing transformation for the chroma block (step, S1610).

As described above, the partition information may be information whether the first block is partitioned into four second blocks, and as the partition information used in the process of performing transformation, for example, split_transform_flag information may be used.

Since the process that the chroma block of N×2N size is partitioned in a quad tree format based on the partition information, when the chroma format information indicates 4:2:2 chroma format and the chroma block corresponding to the luma block of 2N×2N size is induced by a block of N×2N size, is described with referring to FIG. 8 to FIG. 15, the description for this will be omitted in this embodiment.

The decoder may perform one of inverse transform and dequantization based on the transform block (step, S1620).

The decoder may perform the dequantization based on the quantization parameter provided by encoder and coefficient value of transform block, and perform the inverse transform with a transform block unit for the dequantized result. Residual information may be acquired through the dequantization and inverse transform.

The steps S1600 to S1620 described above may be performed in an encoder in the same way, and may be implemented by a module included in the encoder in FIG. 1 described above and the decoder in FIG. 2 described above.

In the above exemplary systems, although the methods have been described in the form of a series of the steps or blocks, the present invention is not limited to the sequence of the steps, and some of the steps may be performed in different order from other or may be performed simultaneously with other steps. Furthermore, the above-described embodiments include various forms of examples. Accordingly, the present invention should be construed as including all other replacements, modifications, and changes which fall within the scope of the claims.

What is claimed is:

1. A method for decoding an image by a decoding apparatus, comprising:
   inducing, by the decoding apparatus, a chroma component block corresponding to a luma component block based on chroma format information that indicates a chroma component sampling corresponding to a luma component sampling;
   partitioning, by the decoding apparatus, the chroma component block into a transform block for the chroma component to transform the chroma component block based on partition information that represents whether a first block is partitioned into a second block for performing transform; and
   acquiring, by the decoding apparatus, residual information of a transform block for the chroma component by performing at least one of inverse transform and dequantization based on the transform block for the chroma component,
   acquiring, by the decoding apparatus, transform coefficient information for the chroma component block of N×2N size, if the partition information indicates that the first block is not partitioned into the second block for performing transform,
   wherein in the step of inducing the chroma component block,
   if the chroma format information indicates 4:2:2 chroma format and a size of the luma component block is 2N×2N, the chroma component block is induced to N×2N size,
   wherein the step of acquiring the transform coefficient information includes:
   acquiring transform coefficient information for a first chroma component block of N×N size which is included in the chroma component block of N×2N size; and
   acquiring transform coefficient information for a second chroma component block of N×N size which is included in the chroma component block of N×2N size.

2. The method of claim 1, wherein in the step of partitioning the chroma component block into a transform block for the chroma component,
   if the partition information indicates that the first block is partitioned into the second block for performing transform, the chroma component block of N×2N size is partitioned into a first transform block and a second transform block of N×N size.

3. The method of claim 2, wherein in the step of partitioning the chroma component block into a transform block for the chroma component,
   wherein the first transform block is partitioned into four transform blocks in a quad tree format based on the partition information for the first transform block, and
   wherein the second transform block is partitioned into four transform blocks in a quad tree format based on the partition information for the second transform block.

4. The method of claim 1, wherein in the step of partitioning the chroma component block into a transform block for the chroma component includes:
   constructing the chroma component block of N×2N size by the first chroma component block and the second chroma component block of N×N size; and
   partitioning at least one of the first chroma component block and the second chroma component block in the same partition form with the partition form for transforming the luma component block.

5. The method of claim 1, wherein in the step of partitioning the chroma component block into a transform block for the chroma component includes:
   constructing a chroma component block of N×N size by down sampling the chroma component block of N×2N size; and
   partitioning the chroma component block of N×N size in a quad tree format based on the partition information.

6. The method of claim 1, wherein in the step of partitioning the chroma component block into a transform block for the chroma component includes:
   constructing a chroma component block of 2N×2N size by adding a dummy block of N×2N size to the chroma component block of N×2N size; and
   partitioning the chroma component block of 2N×2N size into four transform blocks of N×N size,
   wherein the dummy block is a block having zero value, and
   wherein the transform block of N×N size which is partitioned from the dummy block does not perform the inverse transform.

7. The method of claim 1, wherein in the step of partitioning the chroma component block into a transform block for the chroma component includes:
   constructing the chroma component block of N×2N size by the first chroma component block of N×N size which is comprised of samples located at even lines within the chroma component block of N×2N size and the second aroma component block of N×N size which is comprised of samples located at odd lines within the chroma component block of N×2N size; and
   partitioning the first chroma component block and the second chroma component block in a quad tree format based on the partition information.

* * * * *